United States Patent Office 2,975,176
Patented Mar. 14, 1961

2,975,176
MORPHOLIDES AND THIAMORPHOLIDES OF 1,4a-DIMETHYL-1-CARBOXY - 6 - HYDROXY - 1,2,3,4, 4a,9,10,10a - OCTAHYDROPHENANTHRENE - 7-CARBOXYLIC ACIDS, 7-ALKANOIC ACIDS AND 7-ALKANETHIONIC ACIDS AND THEIR ETHERS AND ESTERS

Roy H. Bible, Jr., Morton Grove, Ill., assignor to G. D. Searle & Co., Chicago, Ill., a corporation of Delaware
No Drawing. Filed Aug. 28, 1959, Ser. No. 836,616
13 Claims. (Cl. 260—247.1)

The present invention relates to the morpholides and thiamorpholides of 1,4a-dimethyl-1-carboxy-6-hydroxy-1,2,3,4,4a,9,10,10a - octahydrophenanthrene-7-carboxylic acids, 7-alkanoic acids and 7-alkanethionic acids, their ethers and esters. These compounds can be represented by the general structural formula

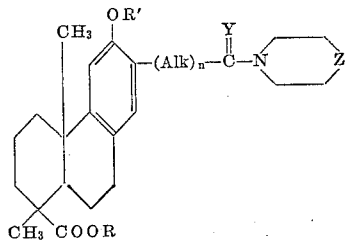

wherein R and R' are hydrogen or lower alkyl radicals, $n$ is zero or 1, Alk is an alkylene radical and Y and Z are oxygen or sulfur.

In the foregoing structural formula R and R' can be methyl, ethyl, straight-chain or branched propyl, butyl, amyl, or hexyl groups. The group Alk can be a lower alkylene group such as ethylene, trimethylene, tetramethylene, pentamethylene, or hexamethylene, but is preferably methylene.

The foregoing compounds are anti-oxidants and ultraviolet shields, sun-burn screens, and inhibitors of the sodium retaining action of aldosterone.

These morpholides and thiamorpholides are conveniently prepared by heating a compound of the structural formula

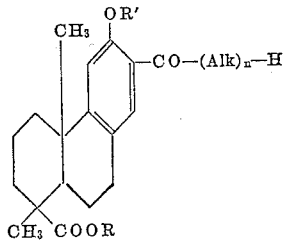

with sulfur and morpholine or thiamorpholine. The reaction mixture contains the compounds in which Y is oxygen or sulfur in an admixture, from which they are readily separated by chromatography.

The compounds of the first formula hereinabove are also useful as intermediates for the preparation of compounds of the formula

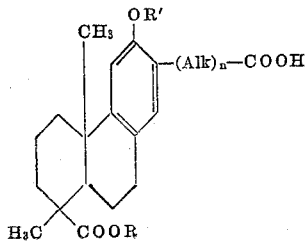

and their esters; these compounds have an anti-inflammatory action, e.g. against the edema associated with local irritation. This preparation is carried out by hydrolysis in a medium comprising sulfuric acid, acetic acid and water. The resulting acids, on treatment with thionyl chloride, form the acid halides of the structural formula

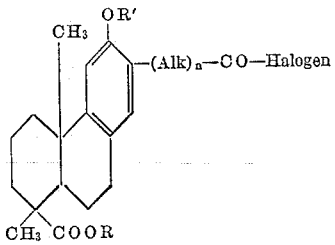

(In the case where the integer $n$ is zero and at the same time R' is hydrogen, it is more practical to prepare first the sodium salt and then treat with the thionyl halide.) On reaction of the acid halide with morpholine or thiamorpholine there are obtained the compounds of the first structural formula hereinabove in which Y is oxygen.

On treatment of the compounds of the first structural formula above wherein Y is oxygen with phosphorus pentasulfide, the Y group is changed to sulfur.

An alternate procedure suitable for the preparation of the compounds in which Y is oxygen, and particularly for the compounds in which both R and R' are hydrogen, comprises heating of the lactones of 1,4a-dimethyl-1-carboxy - 6 - hydroxy-1,2,3,4,4a,9,10,10a-octahydrophenanthrene-7-alkanoic acid with morpholine or thiamorpholine. The carboxyl group in the 1-position does not react because of steric hinderance. The compounds of the structural formula

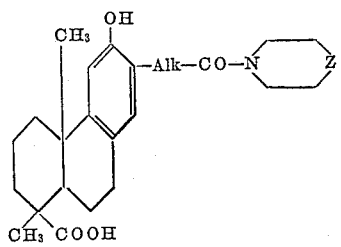

thus produced can be esterified in the 1-position by treatment with a molecular equivalent of a dialkyl sulfate and a molecular equivalent of an alkali metal hydroxide in a lower alkanol.

The compounds which constitute this invention will be described in further detail by the following examples which are given by way of illustration only and are not to be construed as limiting the invention in spirit or in scope. In these examples, temperatures are given in degrees centigrade (° C.), pressures in millimeters (mm.) of mercury and quantities of materials in parts by weight. Rotational data refer to specific rotations determined at 25° C. with respect to the sodium D-line.

This application is a continuation-in-part of my copending application Serial No. 666,246, filed June 17, 1957, which issued as U.S. Patent 2,902,494 on September 1, 1959.

*Example 1*

An intimate mixture of 22.9 parts of methyl O-methyl-7-acetylpodocarpate, 3.2 parts of sulfur and 8.7 parts of morpholine is heated under reflux for 10 hours and then poured, with stirring, into several times its volume of water. The precipitated product is dissolved by extraction with ether, and the ethereal solution is washed with several small portions of water and concentrated to dryness under reduced pressure. The residue in a minimum quantity of a 20 volume percent solution of benzene in petroleum ether is poured onto a chromatography column prepared from 1700 parts of silica. The column is eluted with mixtures of benzene and petroleum ether containing gradually increasing proportions of benzene, with benzene, and then with mixtures of benzene and ethyl acetate containing gradually increasing proportions of ethyl acetate. While the exact concentrations at which particular compounds are eluted from the column are subject to variations dependent upon such factors as solvent volumes employed and activity of the silica, there are readily obtained at low concentrations (2–10 volume percent) of ethyl acetate in benzene unreacted methyl O-methyl-7-acetyl-podocarpate, followed by the morpholide of 1,4a-dimethyl-1-methoxycarbonyl-6-methoxy-1,2,3,4,4a,9,10,10a - octahydrophenanthrene - 7 - ethanethionic acid. Upon crystallization from aqueous methanol, eluate residues containing predominantly the latter compound melt at about 170° C. or higher. The purified compound obtained by additional crystallizations from aqueous methanol melts at about 177–180° C. It has the structural formula

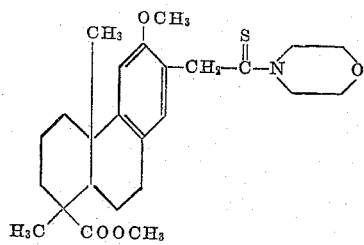

Further development of the chromatography column with increasing amounts of ethyl acetate in benzene and elution with a 40% solution of ethyl acetate in benzene yields the morpholide of 1,4a-dimethyl-1-methoxycarbonyl-6-methoxy - 1,2,3,4,4a,9,10,10a - octahydrophenanthrene-7-acetic acid, melting at about 115–118° C. after recrystallization from aqueous methanol.

Substitution in the foregoing procedure of 9 parts of thiamorpholine for the morpholine yields a mixture of the thiamorpholides of 1,4a-dimethyl-1-methoxycarbonyl-6-methoxy - 1,2,3,4,4a,9,10,10a - octahydrophenanthrene-7-ethanethionic acid and the thiamorpholide of 1,4a-dimethyl-1-methoxycarbonyl-6-methoxy-1,2,3,4,4a,9,10,10a-octahydrophenanthrene-7-acetic acid. This mixture is separated by chromatography over silica gel as in the preceding process. The compounds have the structural formula

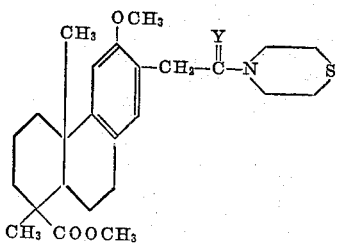

wherein Y is oxygen or sulfur, respectively. The former compound has a strong infrared maximum at about 6.1 microns and ultraviolet absorption bands at 281 and 287 millimicrons with molecular extinction coefficients of about 3270 and 3240 respectively. The latter compound has no appreciable absorption band in the infrared at 6.1 microns but has a very strong band in the ultraviolet absorption spectrum at 281 millimicrons with a molecular extinction coefficient of about 17,600.

*Example 2*

To a mixture of 103 parts of 1,4a-dimethyl-1-methoxycarbonyl-6-methoxy-7 - acetyl - 1,2,3,4,4a,9,10,10a - octahydrophenanthrene and 14.4 parts of sulfur are added 39.2 parts of morpholine. This mixture is heated at moderate reflux for 10 hours and then taken up in benzene and filtered. The filtrate is stripped under aspirator pressure over a steam-bath. The residue is dissolved in ether. The ether is stripped to a residue of about 120 parts. The mixture is cooled, seeded if necessary, and filtered. The yellow crystalline solid is collected, washed with ether and recrystallized with charcoal decolorization from a mixture of chloroform and methanol until the melting point of the almost colorless material is about 177–180° C.

*Example 3*

3.1 parts of the morpholide of 1,4a-dimethyl-1-methoxycarbonyl-6 - methoxy - 1,2,3,4,4a,9,10,10a - octahydrophenanthrene-7-ethanethionic acid are added to a hydrolytic medium prepared from 6.4 parts of concentrated sulfuric acid, 5.2 parts of water and 24.3 parts of acetic acid, and the mixture is heated under reflux for 5 hours. A small amount of insoluble material is removed by filtration of the cooled mixture, and the filtrate is diluted with water until separation of the reaction product is complete. This product is collected and subjected to a preliminary purification by reprecipitation with mineral acid from a 2% sodium hydroxide solution. Upon crystallization from aqueous methanol there is obtained 1,4a-dimethyl-1-methoxycarbonyl-6 - methoxy - 1,2,3,4,4a, 9,10,10a-octahydrophenanthrene-7-acetic acid which melts at about 145–147° C.

*Example 4*

A solution of 10 parts of the lactone of 1,4a-dimethyl-1 - carboxy - 6 - hydroxy - 1,2,3,4,4a,9,10,10a-octahydrophenanthrene-7-acetic acid in 100 parts of morpholine is refluxed for 48 hours. The reaction mixture is cooled and then poured into 2,000 parts of water. The precipitate which forms on standing is collected, washed with water and dried. There is thus obtained the morpholide of 1,4a-dimethyl-1-carboxy-6-hydroxy-1,2,3,4,4a,9,10,10a-octahydrophenanthrene-7-acetic acid which has an infrared absorption band at about 5.9 millimicrons.

To a mixture of 40.2 parts of this morpholide and 4 parts of sodium hydroxide in 300 parts of ethanol are added 15.4 parts of diethyl sulfate. This reaction mixture is allowed to stand for 30 minutes and is then diluted with 5,000 parts of water. The resulting precipitate is collected on a filter, washed with water and recrystallized from aqueous methanol to yield the morpholide of 1,4a - dimethyl - 1 - ethoxycarbonyl - 6 - hydroxy-1,2,3,4,4a,9,10,10a-octahydrophenanthrene-7-acetic acid of the structural formula

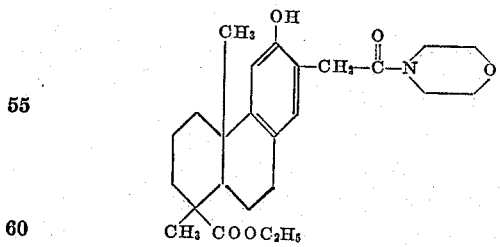

The infrared absorption spectrum of this compound has a strong band at 5.8 microns.

*Example 5*

A stirred mixture of 302.4 parts of methyl O-methyl-podocarpate and 1100 parts of chlorobenzene is maintained at about 10° C. and treated by the gradual addition of 273 parts of aluminum chloride. The mixture is stirred for 10 minutes after the addition of the aluminum chloride has been completed, and then there is gradually added a solution of 185 parts of propionyl chloride in 155 parts of chlorobenzene. The stirred reaction mixture is maintained at about 10–15° C. during this period of addition and for 3 hours thereafter, after which the reaction mixture is allowed to stand at room temperature for 16 hours. It is then poured into 1500 parts of ice water containing 210 parts of concentrated hydrochloric acid. The chlorobenzene is removed by distillation with steam, and the residual aqueous suspension is chilled until crystallization is complete. The solid product is collected and purified by repeated crystallizations from methanol to yield methyl O-methyl-7-propionylpodocarpate melting at 102–103° C.

*Example 6*

An intimate mixture of 17.9 parts of methyl O-methyl-7-propionylpodocarpate, 2.4 parts of sulfur and 6.54 parts of morpholine is heated under reflux for 10 hours. The mixture is diluted while still hot with about 300 parts of benzene; 50 parts of water is added, and after thorough mixing, insoluble material is removed by filtration. The benzene phase is separated from the filtrate, washed with small portions of water, dried, filtered, and concentrated to dryness under reduced pressure. Ether (about 350 parts) is added to the residue, and a distillation is carried out until about 250 parts of the added ether has been removed by volatilization. The solid remaining in the ethereal suspension at this point is collected, washed with additional small portions of ether, and crystallized from aqueous methanol to afford the morpholide of 1,4a-dimethyl-1-methoxycarbonyl-6-methoxy-1,2,3,4,4a,9,10,10a - octahydrophenanthrene - 7 - propanethionic acid which melts at about 178–180° C. and has the structural formula

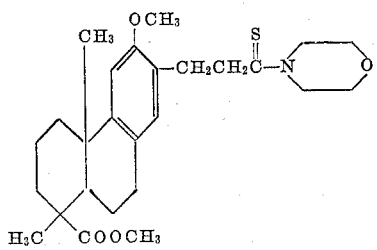

The methanolic mother liquor is evaporated, dried under vacuum and then applied in a 20% solution of benzene and petroleum ether to a silica gel chromatography column. The column is developed as in Example 1 and there is thus obtained an additional yield of the foregoing compound. Further development of the column and elution with a 40% solution of ethyl acetate in benzene yields the morpholide of 1,4a-dimethyl-1-methoxycarbonyl-6-methoxy - 1,2,3,4,4a,9,10,10a - octahydrophenanthrene-7-propionic acid melting at about 151–153° C. after recrystallization from aqueous methanol. The ultraviolet absorption spectrum shows maxima at 280 and 286 millimicrons.

*Example 7*

50 parts of the morpholide of 1,4a-dimethyl-1-methoxycarbonyl-6-methoxy - 1,2,3,4,4a-9,10,10a - octahydrophenanthrene-7-propanethionic acid are added to a hydrolytic medium prepared from 103 parts of concentrated sulfuric acid, 83.6 parts of water and 392 parts of acetic acid, and the mixture is heated under reflux for 5 hours. A small amount of insoluble material is removed by filtration of the cooled mixture. The filtrate is diluted with water until separation of the reaction product is complete, and this product is collected and subjected to a preliminary purification by reprecipitation with mineral acid from a 2% sodium hydroxide solution. By several crystallizations from aqueous methanol there is then obtained 1,4a - dimethyl - 1 - methoxycarbonyl-6-methoxy-1,2,3,4,4a,9,10,10a-octahydrophenanthrene - 7 - propionic acid which melts at about 143–144.5° C.

*Example 8*

By the procedure of Example 5, with the substitution of 241 parts of valeryl chloride for the propionyl chloride, there is obtained methyl O-methyl-7-valerylpodocarpate. Substitution of 25.7 parts of this compound for the methyl O-methyl-7-acetylpodocarpate in the procedure of Example 1 affords the morpholide of 1,4a-dimethyl - 1 - methoxycarbonyl - 6 - methoxy - 1,2,3,4, 4a,9,10,10a - octahydrophenanthrene - 7 - pentanethionic acid. Chromatography as described in Example 1 also yields the morpholide of 1,4a-dimethyl-1-methoxycarbonyl - 6 - methoxy - 1,2,3,4,4a,9,10,10a - octahydrophenanthrene-7-pentanoic acid. The infrared spectrum of the pentanethionic acid derivative shows maxima at 5.8 and 6.7 microns. The infrared spectrum of the pentanoic acid derivative shows maxima at 5.8 and 6.1 microns. Both compounds have specific rotations of about +90°. The pentanethionic acid shows an ultraviolet maximum at about 280 millimicrons with a molecular extinction coefficient of about 18,000.

*Example 9*

By substituting 157 parts of acetyl chloride for the propionyl chloride and 326.4 parts of ethyl O-ethylpodocarpate for the methyl O-methylpodocarpate used in Example 5 there is obtained ethyl O-ethyl-7-acetylpodocarpate. Substitution of an equivalent amount of this compound for the methyl O-methyl-7-acetylpodocarpate of Example 1 yields the morpholide of 1,4a-dimethyl-1-ethoxycarbonyl - 6 - ethoxy - 1,2,3,4,4a, 9, 10a - octahydrophenanthrene-7-ethanethionic acid. The specific rotation is about 96°. Chromatography of the material in the mother liquor yields as a second product the morpholide of 1,4a-dimethyl-1-ethoxycarbonyl-6-ethoxy-1,2,3, 4,4a,9,10,10a - octahydrophenanthrene - 7 - acetic acid. The compound shows a specific rotation of about +99°.

*Example 10*

A mixture of 7.4 parts of O-methyl-7-propionylpodocarpic acid, 1.49 parts of sulfur, and 4.05 parts of morpholine is heated under moderate reflux for 15 hours. The reaction mixture is taken up in 310 parts of benzene. Ten parts of activated charcoal is added and the mixture is stirred for 5 minutes and filtered. The filtrate is taken to dryness by distillation of the solvent under reduced pressure. The residue is extracted with 180 parts of ether, and the ether extract is discarded. The residue is crystallized several times from methanol to afford the morpholide of 1,4a-dimethyl-1-carboxy-6-methoxy - 1,2,3,4,4a,9,10,10a - octahydrophenanthrene - 7-propanethionic acid as a light yellow crystalline material which melts at about 233–235° C. and has the structural formula

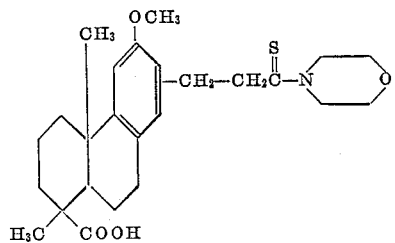

The methanolic mother liquors are chromatographed by the procedure of Example 6 to yield the morpholide of 1,4a - dimethyl - 1 - carboxy - 6 methoxy - 1,2,3,4,4a,9, 10,10a - octahydrophenanthrene - 7 - propionic acid as light yellow crystals.

Substitution of an equivalent amount of O-methyl-7-acetylpodocarpic acid for O-methyl-7-propionylpodocarpic acid yields 1,4a-dimethyl-1-carboxy-6-methoxy-1,-2,3,4,4a,9,10,10a-octahydrophenanthrene-7-ethanethionic acid morpholide and the morpholide of 1,4a-dimethyl-1-carboxy-6-methoxy - 1,2,3,4,4a,9,10,10a-octahydrophenanthrene - 7 - acetic acid. The thionic acid derivative has an ultra-violet maximum at about 280 millimicrons with and extinction coefficient of about 17,900.

*Example 11*

In a low-pressure hydrogenation vessel is placed a mixture of 12.5 parts of methyl O-methyl-7-(α-methyl-β-carboxyvinyl)podocarpate, 1 part of a 5% palladium charcoal catalyst, and 80 parts of ethanol. This mixture is shaken under a hydrogen atmosphere at a pressure of about 29 pounds per square inch for 18 hours. The catalyst is removed by filtration, and the solvent is distilled from the filtrate. The non-volatile yellow glass which is obtained as a residue is analyzed for any unreduced olefin by determining the ultraviolet absorption spectrum in methanolic solution at a concentration of 0.1 gram per liter. If there is any appreciable peak near 268 millimicrons, the hydrogenation step is repeated. The product can be used without further purification, or if further purification is desired, the material can be distilled from a short-path distillation apparatus at about 210° C. at a pressure of about 0.05 mm. This compound is β-(1,4a-dimethyl-1-methoxycarbonyl-6-methoxy-1,2,3,4,4a,9,10,10a-octahydro-7-phenanthrene) butyric acid.

A mixture of 30 parts of this acid, 19 parts of thionyl chloride and 1 part of pyridine is refluxed for 20 minutes. The excess thionyl chloride is then distilled off under reduced pressure. Benzene is added and then removed by distillation in order to remove the last traces of thionyl chloride. A cold solution of the acid chloride thus obtained in 250 parts of benzene is added slowly to a cold solution of 100 parts of morpholine in 250 parts of benzene. The resulting mixture is allowed to stand for 15 minutes and then refluxed for one hour. The benzene solution is washed successively with water, 2% aqueous hydrochloric acid solution, 2% aqueous sodium hydroxide solution and then with water. The solvent is distilled from the washed solution to yield the morpholide of β-(1,4a-dimethyl-1-methoxycarbonyl-6-methoxy-1,2,3,4,4a,9,10,10a-octahydro-7-phenanthrene)butyric acid of the structural formula.

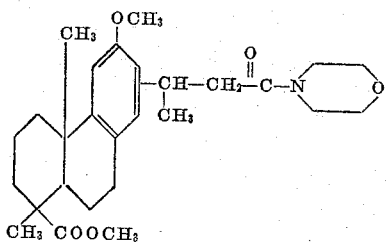

The ultraviolet absorption spectrum shows maxima at about 280 and 287 millimicrons with molecular extinction coefficients of 3280 and 3240° respectively. The specific rotation is about +100°.

Substitution of 100 parts of thiamorpholine for the morpholine in the foregoing procedure yields the corresponding thiamorpholide. Infrared maxima are observed at about 5.81 and 6.1 microns and the specific rotation is +97°.

*Example 12*

A mixture of 20 parts of the morpholide of β-(1,4a-dimethyl-1-methoxycarbonyl-6-methoxy-1,2,3,4,4a,9,10,10a-octahydro-7-phenanthrene)butyric acid and 30 parts of powdered phosphorus pentasulfide is refluxed in 200 parts of benzene for 10 hours. The solution is cooled and then stirred slowly into 2,000 parts of cold water. The benzene solution is washed with 1% sodium hydroxide solution and then with water, dried over anhydrous sodium sulfate and evaporated. The residue consists of an orange glass. The morpholide of β-(1,4a-dimethyl-1-methoxycarbonyl-6-methoxy-1,2,3,4,4a,9, 10,10a-octahydro-7-phenanthrene)butanethionic acid thus obtained has the formula

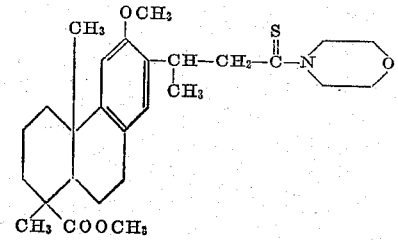

The ultraviolet absorption spectrum shows a maximum at about 280 millimicrons with a molecular extinction coefficient of about 18,100.

*Example 13*

A mixture of 3 parts of 1,4a-dimethyl-1-methoxycarbonyl-6-methoxy-1,2,3,4,4a,9,10,10a-octahydrophenanthrene-7-carboxylic acid, 10 parts of thionyl chloride and 0.1 part of pyridine is refluxed for 20 minutes after which the excess thionyl chloride is distilled off under reduced pressure. Benzene is added and vacuum distillation is resumed to remove the last traces of thionyl chloride along with the benzene. The residue, containing the acid chloride is dissolved in 25 parts of benzene and then added slowly to a cold solution of 10 parts of morpholine in 25 parts of benzene. The resulting mixture is allowed to stand for 15 minutes and is then refluxed for 45 minutes. The benzene solution is washed successively with water, 2% aqueous hydrochloric acid solution, 2% aqueous potassium hydroxide solution and then with water. The solvent is distilled off to yield the morpholide of 1,4a-dimethyl-1-methoxycarbonyl-6-methoxy-1,2,3,4,4a,9,10,10a-octahydrophenanthrene-7-carboxylic acid of the structural formula

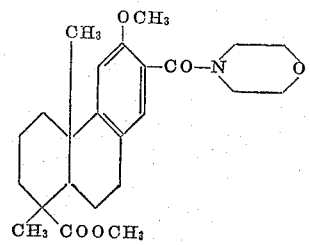

The infrared absorption spectrum shows a maximum at about 6.13 microns.

Substitution of thiamorpholine in this procedure yields the corresponding thiamorpholide.

Cautious treatment of either of these products with phosphorous pentasulfide by the procedure of the preceding example yields the corresponding compounds of the structural formula

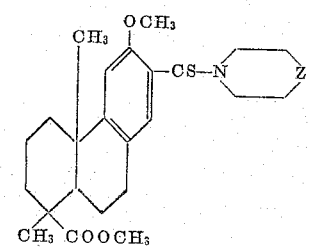

wherein Z is oxygen or sulfur. The first of these, the morpholide of 1,4a-dimethyl-1-methoxycarbonyl-6-methoxy-1,2,3,4,4a,9,10,10a - octahydrophenanthrene-7-methanethionic acid has a specific rotation of about +105°. The second, the thiamorpholide of 1,4a-dimethyl-1-methoxycarbonyl-6-methoxy-1,2,3,4,4a,9,10,10a-octahydrophenanthrene-7-methanethionic acid has a specific rotation of about +101°.

What is claimed is:
1. A compound of the structural formula

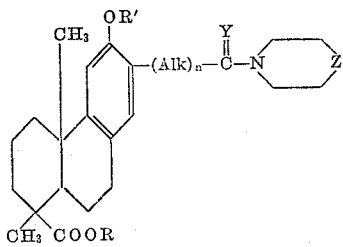

wherein R and R' are members of the class consisting of hydrogen and lower alkyl radicals, $n$ is an integer of the group consisting of 0 and 1, Alk is a lower alkylene radical, and Y and Z are members of the class consisting of oxygen and sulfur.

2. A compound of the structural formula

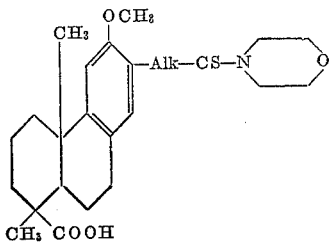

wherein Alk is a lower alkylene radical.

3. Morpholide of 1,4a-dimethyl-1-carboxy-6-methoxy-1,2,3,4,4a,9,10,10a - octahydrophenanthrene - 7 - ethanethionic acid.

4. A compound of the structural formula

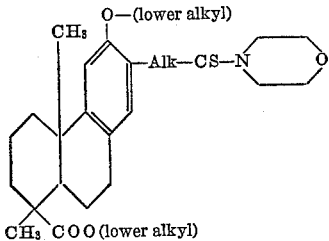

wherein Alk is a lower alkylene radical.

5. Morpholide of 1,4a-dimethyl-1-methoxycarbonyl-6-methoxy-1,2,3,4,4a,9,10,10a-octahydrophenanthrene - 7-ethanethionic acid.

6. Morpholide of 1,4a-dimethyl-1-methoxycarbonyl-6-methoxy-1,2,3,4,4a,9,10,10a-octahydrophenanthrene - 7-propanethionic acid.

7. Morpholide of 1,4a-dimethyl-1-methoxycarbonyl-6-methoxy-1,2,3,4,4a,9,10,10a-octahydrophenanthrene - 7-methanethionic acid.

8. A compound of the structural formula

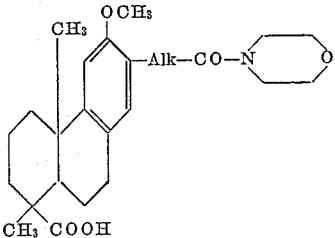

wherein Alk is a lower alkylene radical.

9. Morpholide of 1,4a-dimethyl-1-carboxy-6-methoxy-1,2,3,4,4a,9,10,10a-octahydrophenanthrene - 7 - propionic acid.

10. A compound of the structural formula

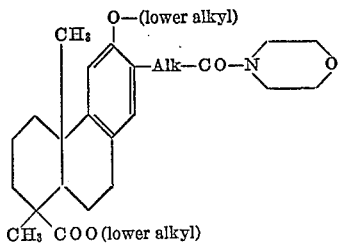

wherein Alk is a lower alkylene radical.

11. Morpholide of 1,4a-dimethyl-1-methoxycarbonyl-6-methoxy-1,2,3,4,4a,9,10,10a-octahydrophenanthrene - 7-acetic acid.

12. Morpholide of 1,4a-dimethyl-1-methoxycarbonyl-6-methoxy-1,2,3,4,4a,9,10,10a-octahydrophenanthrene - 7-propionic acid.

13. Morpholide of 1,4a-dimethyl-1-methoxycarbonyl-6-methoxy-1,2,3,4,4a,9,10,10a-octahydrophenanthrene - 7-carboxylic acid.

No references cited.